United States Patent
Wallerstorfer

(10) Patent No.: US 12,042,749 B2
(45) Date of Patent: Jul. 23, 2024

(54) FILTER WITH CENTERING

(71) Applicant: ACLARIS WATER INNOVATIONS GMBH, LINDAU, ZWEIGNIEDERLASSUNG REBSTEIN, Rebstein (CH)

(72) Inventor: Kurt Wallerstorfer, Strasswalchen (AT)

(73) Assignee: Aclaris Water Innovation GmbH, Lindau, Zweigniederlassung Rebstein, Rebstein (CH)

( * ) Notice: Subject to any disclaimer, the term of this patent is extended or adjusted under 35 U.S.C. 154(b) by 0 days.

(21) Appl. No.: 18/043,836

(22) PCT Filed: Sep. 1, 2021

(86) PCT No.: PCT/EP2021/074140
§ 371 (c)(1),
(2) Date: Mar. 2, 2023

(87) PCT Pub. No.: WO2022/049129
PCT Pub. Date: Mar. 10, 2022

(65) Prior Publication Data
US 2023/0271116 A1    Aug. 31, 2023

(30) Foreign Application Priority Data

Sep. 3, 2020 (DE) ............ 10 2020 123 008.7
Mar. 22, 2021 (DE) ............ 10 2021 107 068.6

(51) Int. Cl.
*B01D 29/96* (2006.01)
*A47J 31/60* (2006.01)
(Continued)

(52) U.S. Cl.
CPC ............ *B01D 29/96* (2013.01); *A47J 31/605* (2013.01); *B01D 29/114* (2013.01);
(Continued)

(58) Field of Classification Search
CPC ...... B01D 2201/316; B01D 2201/4046; B01D 2201/4053; B01D 2201/4061; B01D 2201/4076; B01D 35/306
See application file for complete search history.

(56) References Cited

U.S. PATENT DOCUMENTS 8,864,866 B2    10/2014  Osendorf et al.
2006/0054547 A1   3/2006  Richmond et al.
(Continued)

FOREIGN PATENT DOCUMENTS

CN    101594922 A   12/2009
DE    19717054 C2    7/1999
(Continued)

OTHER PUBLICATIONS

International Preliminary Report on Patentability for International Patent Application No. PCT/EP2021/074140, mailing date of Oct. 20, 2022, 18 pages with English Translation.
(Continued)

*Primary Examiner* — Benjamin M Kurtz
(74) *Attorney, Agent, or Firm* — Christopher J. Volkmann; Kelly, Holt & Christenson, PLLC.

(57) ABSTRACT

A filter cartridge for use in the interior of a water tank of a household appliance, the wall of which separates a housing internal side from a housing external side. A filter inlet opening which in the operation of the filter cartridge is open in relation to the external environment of a filter housing. A device for water conduction comprises at least one filter chamber having at least one filter medium and terminates in a filter outlet opening for suctioning water from the filter cartridge in the interior of the filter housing, downstream of the filter inlet opening relative to the flow direction of the water during operation. A filter port has an annular filter sealing face for the connection of the filter cartridge in a water tank. The filter sealing face has a separately disposed
(Continued)

filter-proximal guide structure for receiving a centering element for centering the filter cartridge.

16 Claims, 15 Drawing Sheets

(51) Int. Cl.
    *B01D 29/11*     (2006.01)
    *B01D 35/153*     (2006.01)
    *C02F 1/00*     (2023.01)

(52) U.S. Cl.
    CPC ............ *B01D 35/153* (2013.01); *C02F 1/003* (2013.01); *B01D 2201/4007* (2013.01); *B01D 2201/4053* (2013.01); *C02F 2201/006* (2013.01); *C02F 2307/10* (2013.01)

(56) References Cited

U.S. PATENT DOCUMENTS

| | | | |
|---|---|---|---|
| 2009/0242473 A1* | 10/2009 | Wallerstorfer | A47J 31/605 210/232 |
| 2009/0321342 A1 | 12/2009 | Wawrla et al. | |
| 2010/0025317 A1* | 2/2010 | Fall | B01D 29/96 210/232 |
| 2012/0223006 A1 | 9/2012 | Sann et al. | |

FOREIGN PATENT DOCUMENTS

| | | |
|---|---|---|
| DE | 102004049877 A1 | 4/2006 |
| DE | 102006027267 A1 | 1/2007 |
| DE | 102014223648 A1 | 5/2016 |
| EP | 1867606 A1 | 12/2007 |
| EP | 2138078 A1 | 12/2009 |
| EP | 2049218 B1 | 6/2015 |
| EP | 2049220 B1 | 4/2016 |
| EP | 2049221 B1 | 4/2016 |
| EP | 2063972 B1 | 4/2016 |
| EP | 2433906 B1 | 6/2016 |
| EP | 2050218 B1 | 12/2017 |
| RU | 2233607 C2 | 8/2004 |
| RU | 2351271 C2 | 4/2009 |
| RU | 2009108267 A | 9/2010 |
| RU | 2411565 C2 | 2/2011 |
| RU | 2411565 C2 | 2/2011 |
| WO | WO2008017492 A2 | 2/2008 |

OTHER PUBLICATIONS

International Search Report and Written Opinion for International Patent Application No. PCT/EP2021/074140, mailing date of Dec. 9, 2021, 17 pages with machine translation in English.

First Office Action for Chinese Patent Application No. 202180074590.0, dated Oct. 17, 2023. 15 pages including English Translation.

U.S. Appl. No. 18/043,844 Non Final Office Action dated Jun. 23, 2023, 13 pages.

U.S. Appl. No. 18/043,845 Non Final Office Action dated Jul. 13, 2023, 28 pages.

U.S. Appl. No. 18/043,849 Non Final Office Action dated Jun. 22, 2023, 15 pages.

* cited by examiner

FILTER WITH CENTERING

CROSS-REFERENCES TO RELATED APPLICATIONS

This Application is a Section 371 National Stage Application of International Application No. PCT/EP2021/074140, filed Sep. 1, 2021, and published as WO 2022/049129A1 on Mar. 10, 2022, and claims priority to German Application Nos. 10 2021 107 068.6, filed Mar. 22, 2021 and 10 2020 123 008.7 filed Sep. 3, 2020, the contents of each are hereby incorporated by reference in their entirety.

DETAILED DESCRIPTION

Figure 1:
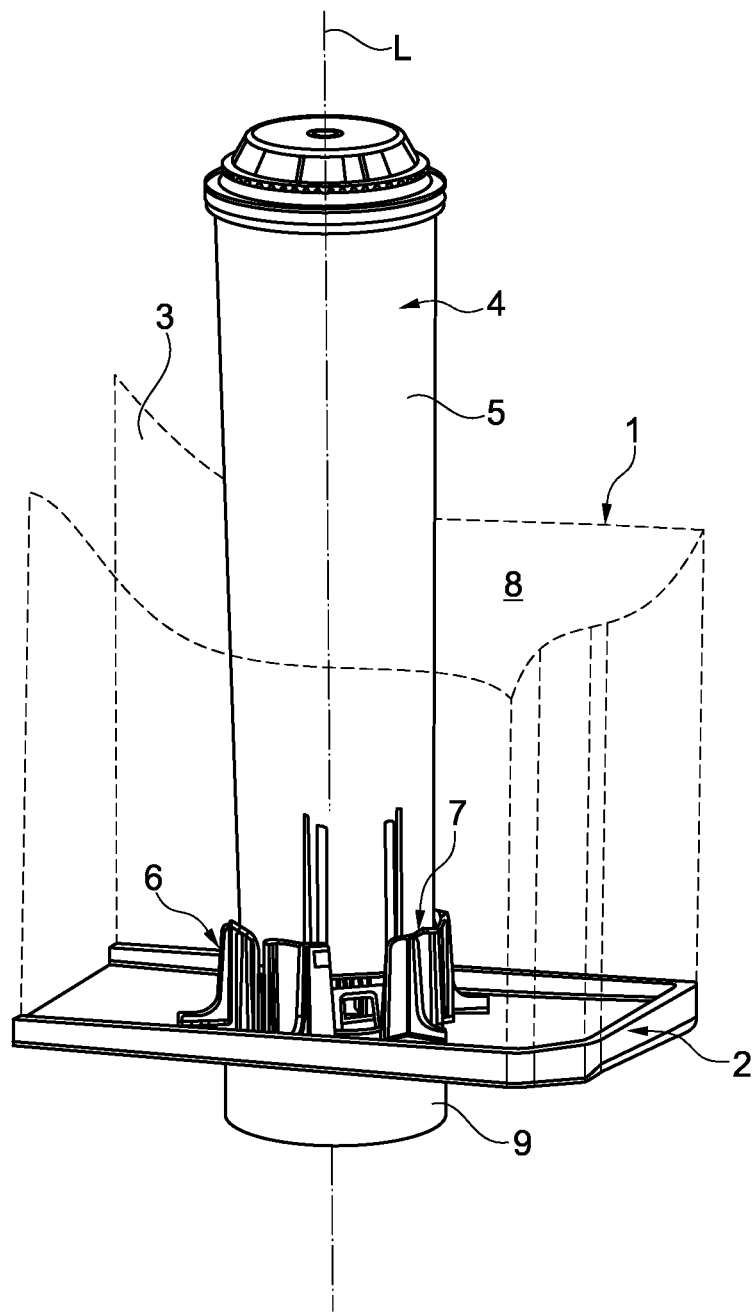
FIG. 1 shows a perspective illustration of a tank bottom with an inserted filter cartridge according to the prior art.

The present disclosure relates to a filter cartridge for use in the interior of a water tank of a household appliance, such as a beverage machine.

Filter cartridges are typically used in water-carrying household appliances with a water tank, in particular in beverage machines such as coffee machines, tea machines, etc., in order to improve the water quality in accordance with the intended application. Filter media for water softening, such as ion exchange resin, or to improve the taste, such as activated carbon, are often used in such filter cartridges. The metered addition of additives, e.g. for health or taste improvement, such as the addition of minerals or vitamins, etc., is also already provided for in combination with filter media.

Water tanks of such machines according to the prior art typically have connection structures on the tank bottom with an annular sealing face for the tight connection of a connection element of the filter cartridge provided for such a tank, which enclose a flow opening in the tank bottom for the water to flow from the filter cartridge and the water tank to the household appliance.

The publications EP 2 138 078 A1 and WO 2008/017492 disclose water tanks and filter cartridges with external centering elements.

Other water tanks and filter cartridges are described, for example, in publications DE 10 2204 049 877 A1, EP 1 867 606 A1 and DE 197 17 054 C2.

In these documents, fixing of the filter cartridge on the tank bottom is described in different ways, e.g. using a seal with a snap-on rim, a bayonet fitting or a screw cap.

Screw and bayonet closures have the disadvantage that they superimpose a rotary movement with a linear movement when establishing the connection, which is difficult to achieve in narrow water tanks and also requires correspondingly resilient, elastic seals.

Although a snap-on rim enables the filter cartridge to be easily inserted in a linear plug-in movement, it is associated with restrictions with regard to the shape of the sealing face.

An object of the present disclosure is therefore to propose such a filter cartridge and an associated water tank without the aforementioned disadvantages.

Proceeding from a filter cartridge according to one example, this object is achieved by the characterizing features of the latter.

In the following, elements to be assigned to the water tank are generally provided with the assigning word beginning "tank" and elements to be assigned to the filter cartridge are generally provided with the assigning word beginning "filter".

Features of advantageous embodiments and developments of the present disclosure are described below in such a way that they are not mandatory, but may be present.

The filter cartridge according to one example is provided with a filter housing, the wall of which separates a housing internal side from a housing external side, wherein a filter inlet opening which in the operation of the filter cartridge is open in relation to the external environment is provided. As a result, the filter cartridge differs from filter devices whose housings are tightly connected to the water pipes of a water network with pressure-resistant connections and are thus integrated into the water network.

Furthermore, a filter cartridge according to one example has a device for water conduction which comprises at least one filter chamber having at least one filter medium and terminates in a filter outlet opening for suctioning water from the filter cartridge, downstream of the filter inlet opening relative to the flow direction during operation. Furthermore, an annular filter connector is provided for the connection of the filter cartridge in a water tank.

Proceeding from such a filter cartridge of this type and a water tank of this type, the above object is achieved by features of the present disclosure.

Accordingly, in a filter cartridge according to one example, a filter-proximal guide structure for receiving a tank-proximal centering element for fixing the filter cartridge is provided within the filter sealing face of the filter connector. The positioning and the fixating can thus be easily accomplished by a centering element projecting from the tank bottom. Since the sealing face itself can be designed independently of such a centering element, there is greater design freedom both in the design of the sealing face or the seal and the centering element.

A filter-proximal guide structure for receiving the centering element when inserting the filter cartridge into the water tank can, for example, form an outlet line of the filter cartridge, which is disposed downstream at the end of the filter section. This dual function of the filter-proximal guide structure, which serves not only for fixing but also for water guidance, results in a space-saving design.

In particular embodiments, the filter-proximal guide structure has one or a plurality of guide ramps aligned obliquely in relation to the mounting direction of the filter cartridge. Such obliquely disposed guide elements are suitable for facilitating the positioning of the filter cartridge during assembly transversely to the assembly direction, since a corresponding detent of a tank-proximal centering element can slide on a guide ramp and thereby steer the filter cartridge into the end position.

For this purpose, several guide ramps can also be provided.

Preferably, the guide ramp or the guide ramps as a centering aid are directed toward a central axis of the filter-proximal guide structure, so that the guide structure is centered when it is pushed onto a correspondingly configured tank-proximal centering element.

The filter-proximal guide structure can be configured and disposed coaxially with a filter sealing face enclosing the guide structure. This centric arrangement enables the open flow cross section for the water to be evenly distributed through the filter-proximal guide structure.

The filter-proximal guide structure can have, for example, one or a plurality of guide faces running parallel to a central axis A and/or one or a plurality of guide faces disposed at an oblique angle thereto. A filter cartridge can first be centered on the oblique guide face when it is placed on a tank-proximal centering element and then further axially displaced so as to be centrally aligned by means of the axis-parallel guide face, for example to establish a sealing and/or fixing form-fit with a sealing and/or fixing face.

In addition, holding or latching elements are advantageously attached in the filter-proximal guide structure. As a result, designs are possible that are kept entirely or partially on the inside, so that external fixing means can be omitted or at least reduced.

In addition, a receptacle for a plug-in element of a tank valve is advantageously provided in the filter-proximal guide structure, which receptacle penetrates the tank-proximal centering element. Such a plug-in element must be movably accommodated in the guide structure of the filter cartridge and must not become blocked during assembly of the filter cartridge, since otherwise the function of the tank valve is prevented. Such a plug-in element thus represents an additional coding to prevent the use of an unsuitable filter cartridge.

Furthermore, it is advantageous if the tank-proximal centering element and the tank valve are adapted to one another in such a way that the tank valve is coded with the centering element. A tank with a tank valve designed in this way can therefore only be operated in conjunction with a suitable centering element. In a particular embodiment of the present disclosure, the plug-in element of the tank valve engages in a passage of the centering element.

The guide structure of the filter cartridge can have one or a plurality of guide grooves for accommodating tank-proximal structures. This results in a kind of tongue and groove structure when centering and fixing the filter, so that the angular position of the filter cartridge is also fixed. This also results in further coding options.

The one or the plurality of guide ramps of the filter-proximal guide structure can also be fitted in one or a plurality of guide grooves for accommodating tank-proximal structures.

As mentioned at the outset, a water tank for a household appliance that matches the filter cartridge described above is provided with a tank bottom, wherein an annular tank sealing face is provided on the tank bottom for the tight connection of the filter cartridge, which encloses a tank passage opening for the water to flow out of the filter cartridge through the wall of the tank bottom to the household appliance.

Furthermore, a centering element protruding within the tank sealing face from the tank bottom in the direction of the mounting position of the filter cartridge is provided for insertion into the guide structure of the filter cartridge.

At least one water passage for water from the filter cartridge through the guide structure of an attached filter cartridge to the tank passage opening can be provided on the centering element. As a result, the centering element can bear at least partially on the inner wall of the filter-proximal guide structure without impeding the flow of water.

The tank sealing face is advantageously configured and disposed separately from the centering element, as a result of which these two elements can be designed largely independently of one another and do not influence one another.

One possibility of providing one or a plurality of through-flow openings for the water consists, for example, in the centering element comprising ribs which extend in the flow direction of the water during operation, the intermediate space of said ribs forming a water passage. The ribs can then bear in the radial direction against the filter-proximal guide structure on the external side.

If the centering element is configured with ribs disposed in a star shape, this results in an even distribution of the open flow cross section for the water and at the same time an even bearing contact on the circumference and thus fixing of the filter-proximal guide structure of the filter cartridge.

At least one, preferably several or all of the ribs of the centering element are provided with an upper guide ramp for guiding the filter-proximal guide structure during assembly of the filter cartridge. This guide ramp or these guide ramps can then interact with the corresponding guide ramp or ramps of the guide structure of the filter cartridge. In addition, at least one guide face of the centering element running parallel to the central axis can be provided for axially aligned guidance of the filter cartridge after centering during further attachment and/or insertion.

Furthermore, holding or latching elements can be attached to the centering element, which are adapted to corresponding holding or latching elements of the guide structure of the filter cartridge.

Furthermore, it is advantageous if the centering element is attached to a fastening ring for fastening to the bottom of the tank. In this way, different fastening rings with specific centering elements can be used for water tanks of the same configuration, which are thus specified for different household appliances such as beverage machines, etc.

An exemplary embodiment of the present disclosure is illustrated in the drawing and is explained in more detail hereunder with reference to the figures.

FIG. 1 visualizes the usual configuration of a water tank 1 of a beverage machine, such as a coffee machine, e.g. of a fully automatic coffee machine according to the prior art. The water tank 1 comprises a tank bottom 2 and water tank side walls 3, partially shown with dashed lines. A filter cartridge 4 with a filter housing 5 is inserted into the water tank 1. The connection between the tank bottom 2 and the filter cartridge 4 is realized via tank connection elements 6 on the water tank and filter connection elements 7 on the filter.

The filter cartridge 4 is located in the interior 8 of the water tank 1, i.e. during operation, it stands entirely or partially in the water stored in the water tank 1. A tank port 9 of the water tank 1 for connecting the water tank 1 to the beverage machine (not shown) protrudes from the underside of the water tank 1.

Figure 2:
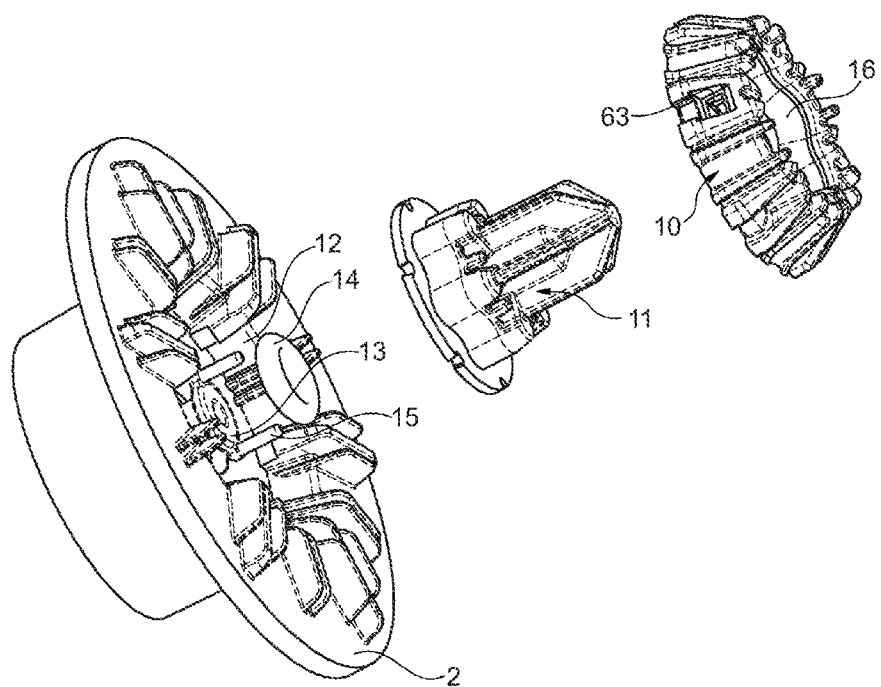
FIG. 2 shows a perspective exploded illustration of a tank bottom with a centering element and a fastening ring, in one example.

FIG. 2 shows a round fragment of the tank bottom 2, wherein a fastening ring 10 and a centering element 11 for insertion into a depression 12 in the tank bottom 2 are provided. A tank valve body 13 with a seal 14 configured as an O-ring, from which two pins 15 protrude upwards, can likewise be seen in FIG. 2. The fastening ring 10 also carries an elastomer seal 16.

Figure 3:
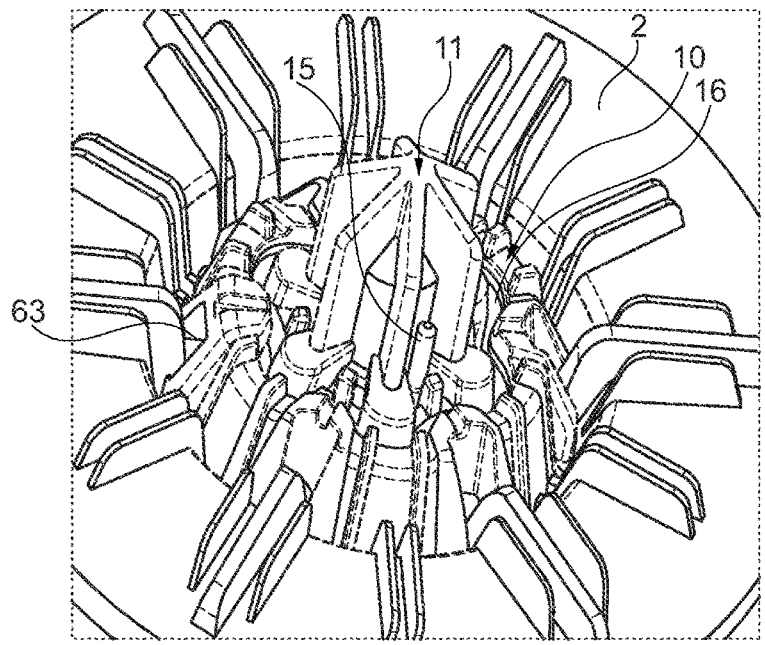
FIG. 3 shows a perspective illustration of the tank bottom according to FIG. 2, with an installed centering element and an installed fastening ring, in one example.
Figure 4:
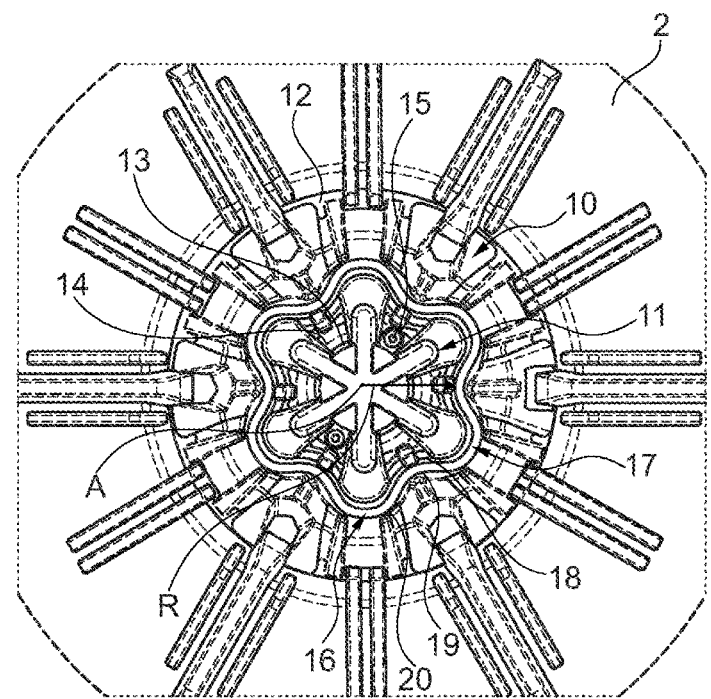
FIG. 4 shows a top view of the tank bottom according to FIGS. 2 and 3.

In FIGS. 3 and 4, the fastening ring 10 and the centering element 11 are installed in the tank bottom 2. It can be seen here that the pins 15 can pass through the centering element and thus form coding elements for coding the water tank in relation to the associated machine connection, by which the tank valve body 13 must be actuated when the water tank is inserted. It is also clearly visible in FIG. 4 that the elastomer seal 16 forming the water tank seal 17 is an annular seal which has a varying radius R along its circumference in relation to a central axis A, so that the internal face of the water tank seal 17 forming a tank sealing face 18 has radial concavities 19 and radial convexities 20. The first tank sealing face 18 simultaneously serves as the first tank fixing face.

Figure 5:
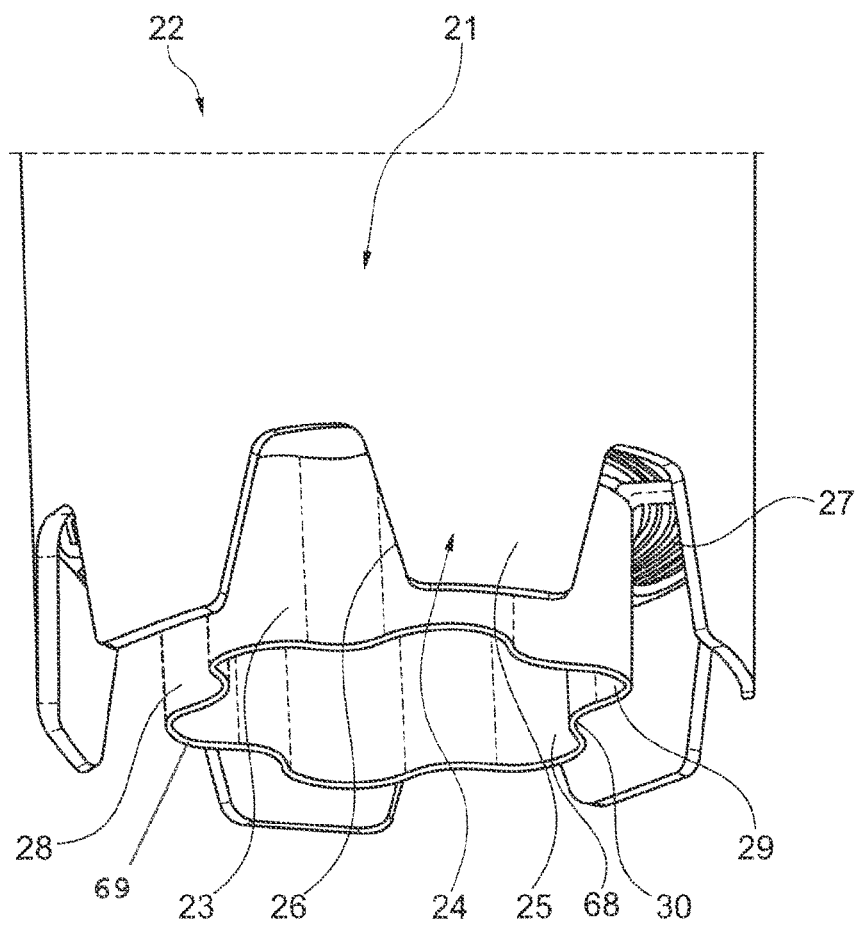
FIG. 5 shows a perspective illustration of the connection region of the filter cartridge when viewed from the side, in one example.

In FIG. 5, the connection region 21 of a matching filter cartridge 22 is shown. A filter port 23 forms an inner ring surrounded by an outer ring 24 with axially extending projections 25 and recesses 26. Located between the inner ring 23 and the outer ring 24 is an annular inlet screen 27 through which water enters the filter cartridge. The external face 28 and the internal face 68 of the filter port 23 are also provided with convexities 29 and concavities 30 to match the tank sealing face 18. The external face 28 and/or the internal face 68 of the filter port 23 can also serve as a filter fixing face.

Figure 6:
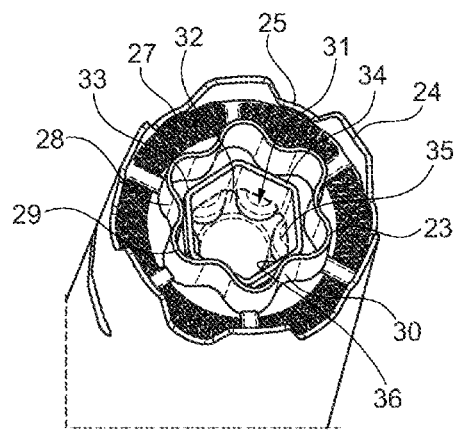
FIG. 6 shows a perspective illustration of the connection region of the filter cartridge when viewed obliquely from below, in one example.
Figure 7:
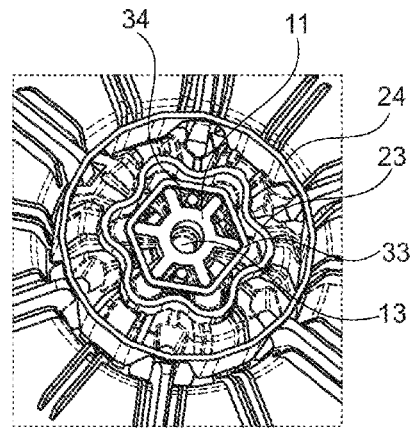
FIG. 7 shows a perspective illustration of a filter cartridge cut open at the level of the filter port, inserted in a tank bottom, in one example.

In the view of FIG. 6, in addition to the parts of the connection region 21 of the filter cartridge 22 described above, the special configuration of a guide structure 31 of the filter cartridge 22 for receiving the centering element 11 is shown. The guide structure has guide grooves 32 which are aligned with the edges 33 of a polygonal ring 34, in the present case for example with six guide grooves which are aligned with six edges of a hexagonal ring. In the sectional view from above according to FIG. 7, the sectional plane goes through this polygonal ring 34.

Figure 8:
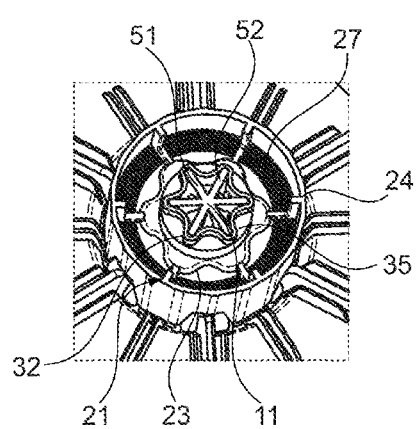
FIG. 8 shows a perspective illustration of a filter cartridge cut open at the level of the guide grooves, inserted in a tank bottom, in one example.

Internal curvatures 35 which lie between the edges 33 and the guide grooves 32 adjoin upward into the interior of the filter cartridge. The internal curvatures 35 form the side walls 36 of the guide grooves 32. Due to this curved shape, the walls 36 of the guide grooves 32 taper both in the axial direction upward (relative to the operating position) and in the radial direction from the inside to the outside. In the intersection point, viewed from above according to FIG. 8, the section plane runs at a height at which the guide grooves 32 are clearly formed. A riser pipe 37 is connected centrally on the inside, through which the water entering the filter cartridge 22 is directed upward to the filter section.

Figure 9:
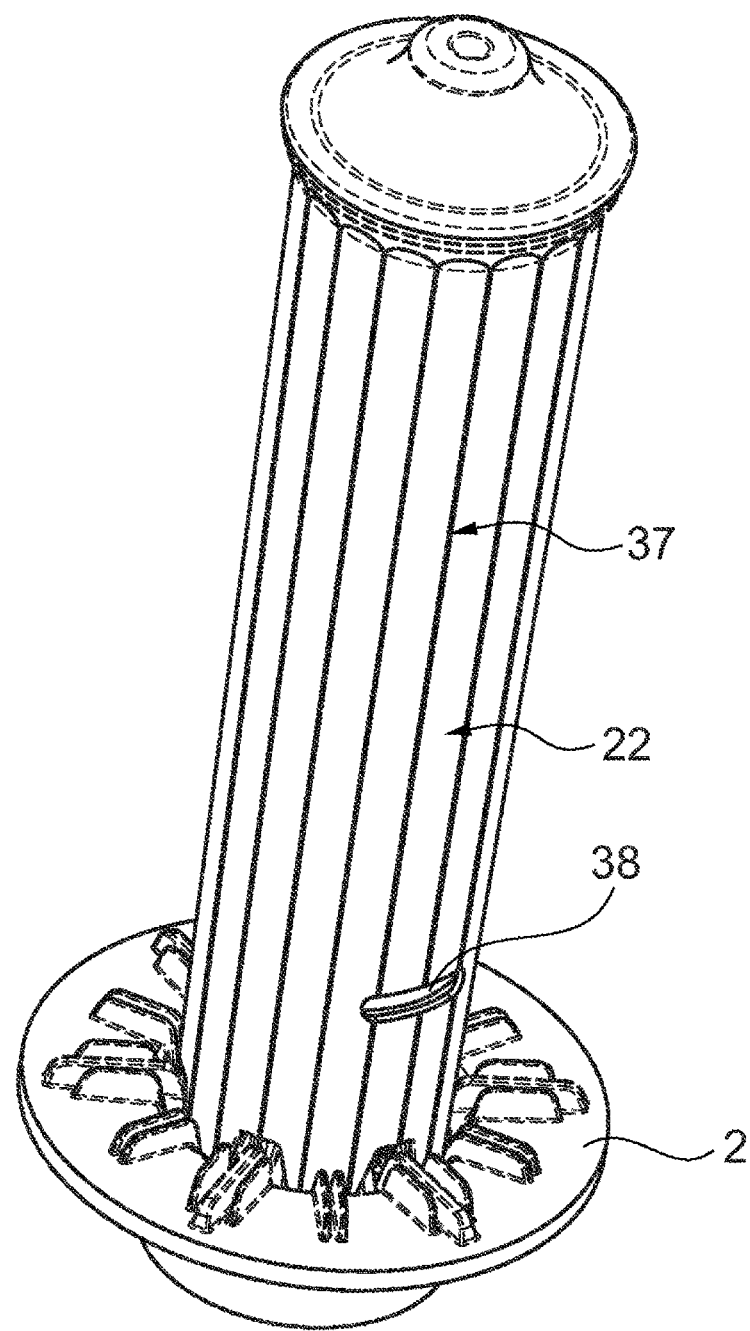
FIG. 9 shows a perspective illustration of a filter cartridge inserted in a tank bottom, in one example.

In FIG. 9, the entire filter cartridge 22 is shown. In a filter housing 37, which has an optional lateral metering opening 38 and the above-described water connection on the bottom. The optional metering opening 38 is only provided in the case of an embodiment of the filter cartridge that is configured for dispensing additives, e.g. minerals, vitamins or the like, from a metering chamber accommodated in the filter housing 37 into the water reservoir. Since such a metering chamber is closed within the filter housing 37 with respect to the filter section, it has no further significance with regard to the filtration. A filter cartridge according to one example can therefore also be readily constructed without this metering chamber and its metering opening 38. In particular, the operating position can be seen in FIG. 9, to which the statements above and below in this description relate.

Figure 10:
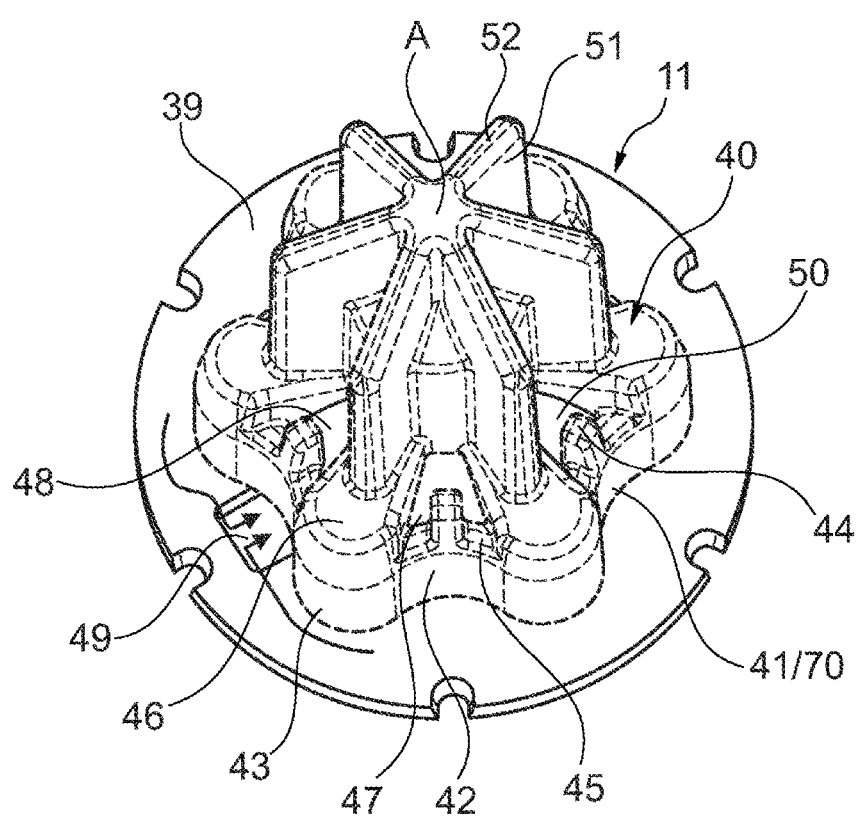
FIG. 10 shows a perspective illustration of the centering element, in one example.

A perspective illustration of the centering element 11 can be seen in FIG. 10. The centering element is provided with a bottom plate 39 which, in the installed state, lies in a receptacle of the elastomer seal and peripherally engages the latter from behind. A centering mandrel 40 protrudes upward from the bottom plate 39 and has an annular external face 41 which also forms a second tank fixing face. This external face 41 has a radius that varies along the circumference in relation to the central axis A, so that this external face 41 also comprises radial concavities 42 and convexities 43. The external face 41 is thus adapted to a corresponding shape of the filter port 23.

For further adaptation, the concavities 42 and convexities 43 of this external face 41 are also configured to periodically oscillate around a circular line and have a round profile. In the illustrated embodiment, six concavities 42 and six convexities 43 are provided along a circular line with a diameter of less than 3 cm, corresponding to the design of the illustrated embodiment of the filter cartridge 22.

With a different filter cartridge, the adaptation of the external face 41 or the second tank fixing face must be modified accordingly.

All adaptations to the external face 41 of the centering mandrel 11 result in only an annular slot between the external face 41 and the elastomer seal 16 for inserting the filter port 23 being open in the installed state. This results in a further coding against the use of an unsuitable filter cartridge. In addition, in this way it is possible to support the filter port 23 on the internal side thereof on the external face 41 of the centering mandrel 11. In this way, the contact pressure of the filter port on the elastomer seal 16 can be increased uniformly over the variable shape along the entire peripheral shape.

At least one upwardly projecting tooth 44 is provided above the annular external face. The one or the plurality of teeth 44 are mounted on a gradation 45 of the centering mandrel 40. Further elevations 46 in relation to the gradation 45 that follow the shape of the external face 41 are attached at a distance from the teeth 44, so that a gap 47 remains between the teeth and the elevations 46. The tooth or teeth 44 and/or the elevations 46 may prevent the use of an axial seal to bypass the coding. Furthermore, a passage opening 48 is provided above the external face 41, which leads to a tank passage opening when the centering element 11 is in the installed state. The filtered water of a filter cartridge 22 can be discharged from the water tank through this passage opening 48.

One or a plurality of bottom passage openings 49 are provided in the bottom plate 39 below the external face 41. Unfiltered water can be directed out of the water tank through these openings in the bottom. Below the elevations 46 and within the wall bearing the external face 41 there results a cavity 50 for receiving the tank valve body 13.

Provided above the annular external face 41 are guide ribs 51 which on the upper side thereof can be beveled, as in the exemplary embodiment shown. The guide ramps 52 formed in this way help when inserting the guide ribs 51 into the guide grooves 32 of a filter cartridge 22. In the sectional view according to FIG. 8, the guide ramps 52 of the guide ribs 51 in the attached filter cartridge 22 can be clearly seen.

The assembled components of the water tank 1 for the connection of a filter cartridge are shown with and without a filter cartridge 22 in FIGS. 11, 11a, 11b, 12 and 12a. The fastening ring 10 is provided with a latching protrusion 53 by way of which it can latch to the tank bottom 2 by engaging behind a bottom rib 54 of the water tank. The elastomer seal 16 has a bottom portion 55 which engages under the fastening ring 10 and thus holds the elastomer seal 16 with the fastening ring 10 on the tank bottom 2.

For sealing in relation to the tank bottom 2, the elastomer seal 16 has a sealing face, which in the present case is realized by a sealing bead 56. For the tight closure of the elastomer seal 16 in relation to the fastening ring 10, an encircling sealing face can be provided at various locations. In the exemplary embodiment illustrated, an annular seal 57 is provided which is formed on top of the elastomer seal 16 and seals with the latter in a sealing groove 58 of the fastening ring.

The elastomer seal 16 includes an outer ring 59 and an inner ring 60 which are integrally molded and bonded together. The outer ring 59 and the inner ring 60 in terms of the shape thereof circumferentially follow the varying radius of the fastening ring 10, of the filter port 23 and of the elastomer seal 16 and the concavities and convexities formed thereby. The outer ring 59 is stepped and carries the annular seal 57 and the sealing bead 56. The outer ring 59 is also provided with one or a plurality of bypass openings 61 through which unfiltered water can enter the annular gap 62 between the outer ring 59 and the inner ring 60 in the flow direction P1. In the assembled state, the bypass opening 61 of the elastomer seal 16 is located directly after a bypass opening 63 in the fastening ring 11, which can also be seen in FIGS. 1 and 3, for example. Through the bypass opening 63, unfiltered water can flow out of the annular gap 62 from the water tank 1 in the direction P2 into the corresponding beverage machine.

Figure 11:
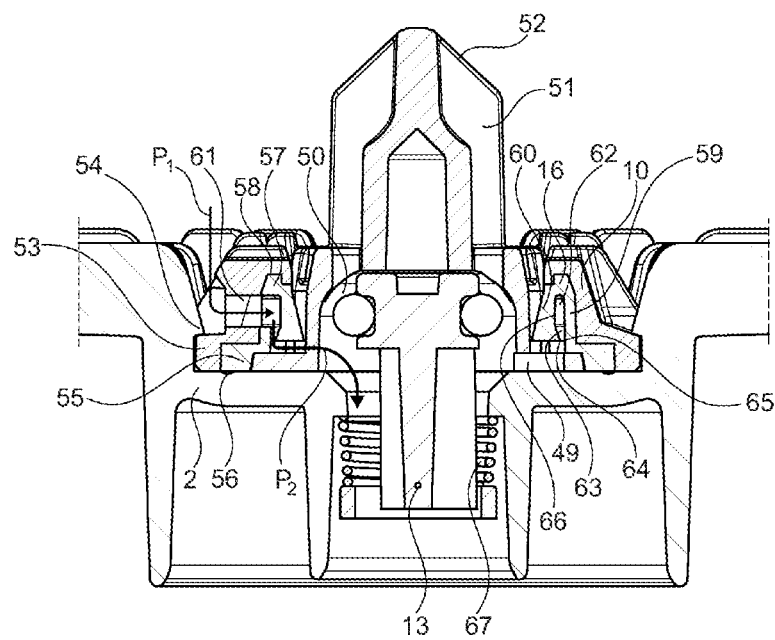
FIG. 11 shows a sectional illustration of a tank bottom without a filter cartridge, with the water tank valve open, in one example.
Figure 11A:
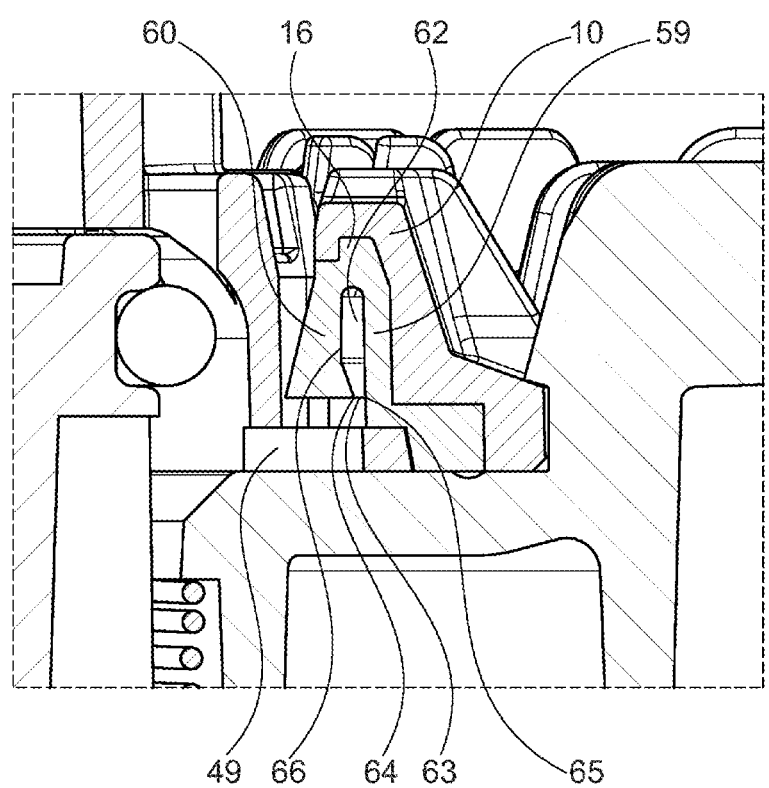
FIGS. 11a and b show two enlarged fragments from FIG. 11 to visualize a closable bypass line in the tank seal, in one example.
Figure 11B:
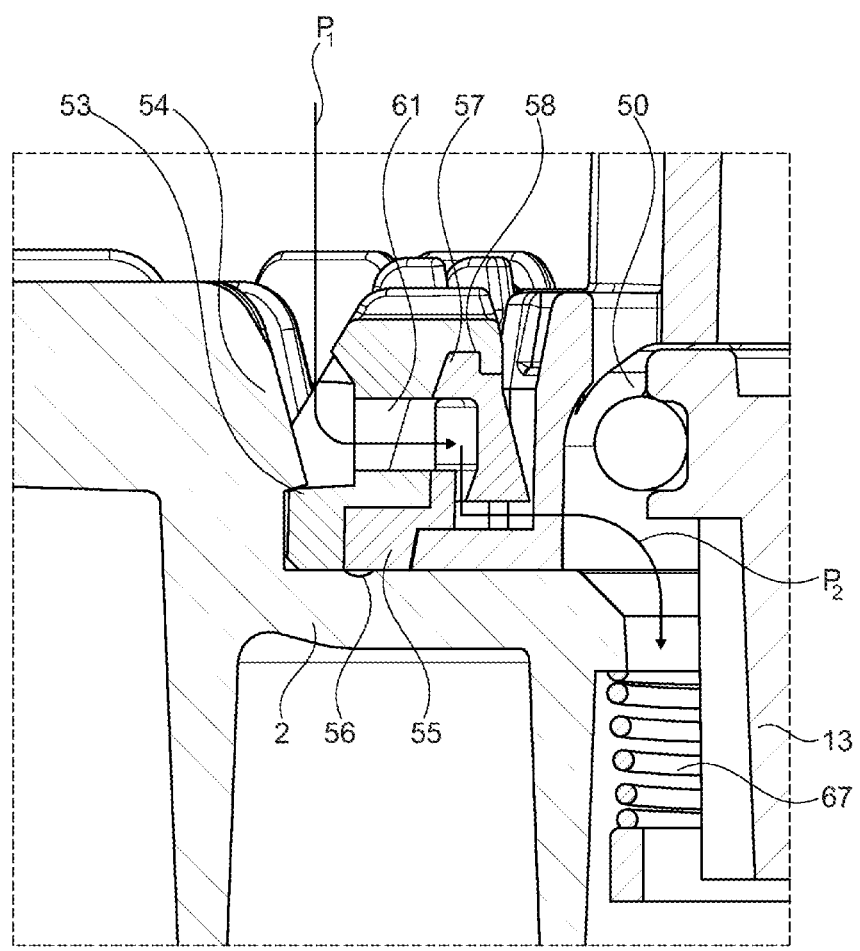

The inner ring 60 on the lower side thereof has a sealing lip 64 which lies opposite a sealing face 65 on the outer ring 59. In the relaxed state of the elastomer seal 16, the annular gap 62 between the outer ring 59 and the inner ring 60 is open at the bottom, as can be seen in FIG. 11, so that the unfiltered water guided in the bypass can flow out of the annular gap 62 in the flow direction P2. In this state, the internal side 66 of the inner ring 60, which forms the water tank seal 17, is beveled inward in the downward profile. The configuration of the bypass is highlighted in the enlargements according to FIGS. 11a and b.

When a filter cartridge 22 with the filter port 23 is inserted, the elastomer seal 16 is deformed so that the internal side 66 is pressed outward and runs essentially perpendicularly along the filter port. The sealing lip 64 is pressed onto the opposite sealing face 65, the annular gap 62 and thus also the bypass through the bypass openings 61, 63 being closed. The deformation generates a contact pressure that presses the tank sealing face 17 against the filter sealing face 28 and at the same time the sealing lip 64 against the sealing face 65. This state is shown in FIG. 12 and FIG. 12a.

Figure 12:
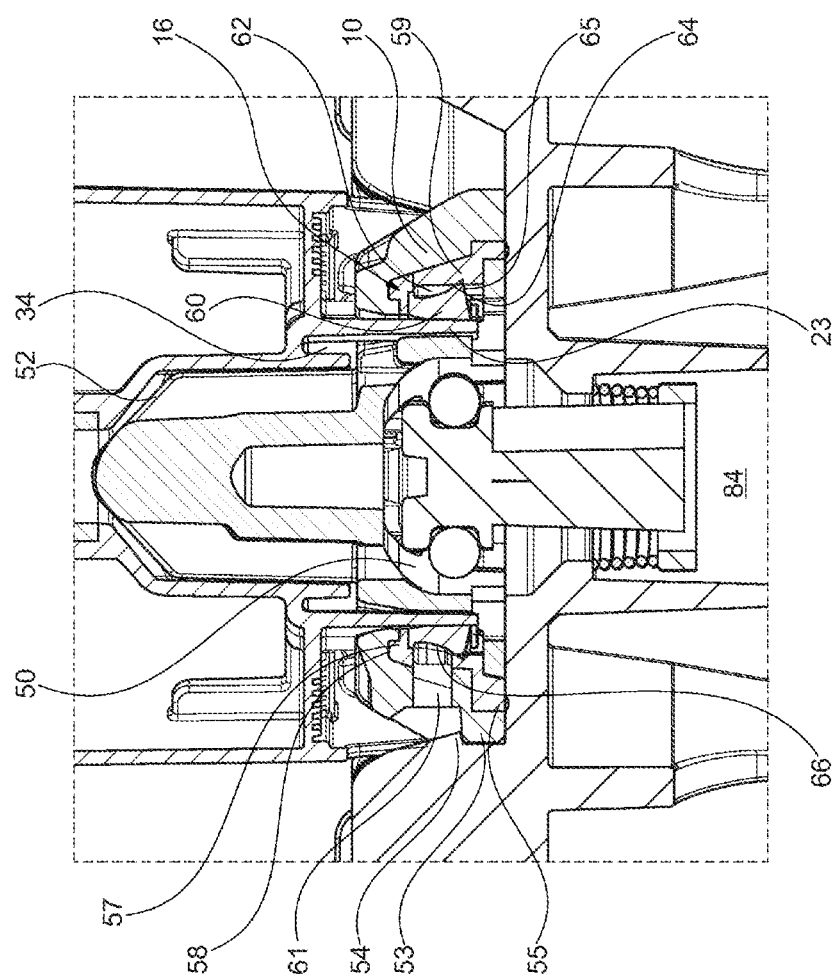
FIG. 12 shows a sectional illustration of a tank bottom according to FIG. 11, with an inserted filter cartridge, in one example.
Figure 12A:
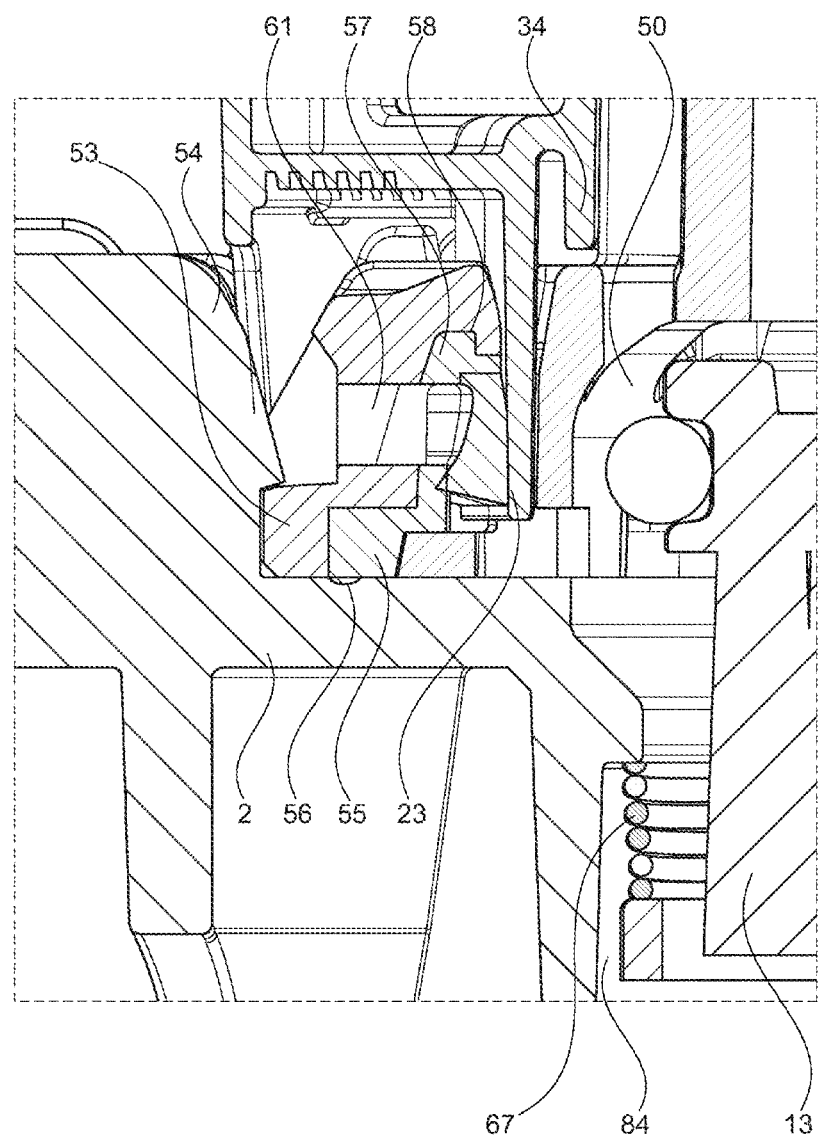
FIG. 12a shows an enlarged fragment from FIG. 12 to visualize the closed bypass line, in one example.

The tank valve body 13 in FIG. 11 and FIG. 12 by a detent of the associated machine, counter a restoring spring 67 into the cavity 50 and is thus in the open position, which corresponds to the inserted water tank. If the water tank is removed from the machine, the tank valve body 13 closes under the pressure of the restoring spring 67.

The tank sealing face 18 is formed by the internal side 66 of the elastomer seal 16 and at the same time represents a first tank fixing face 18. As mentioned above, a first filter fixing face 28 formed by the filter sealing face 28 rests on this side when the filter cartridge 5, 22 is in the inserted state, under a contact pressure that deforms the elastomer seal 16 in such a way that a fixing and sealing form-fit is achieved.

A second filter fixing face 68 (see FIG. 5), which is formed by the internal face of the filter port 23, is in contact with the external face 41 forming the second tank fixing face. This form-fit is also formed under contact pressure. Due to the shape of the filter port 23 according to one example, this configures an annular wall 69 which can be widened in a resilient manner if required. This results in the possibility of tolerance compensation in association with good fixing, which is caused by the corresponding bracing. Due to the mutually parallel or mutually inclined shaping of the first filter fixing face 28 and a second filter fixing face 68, the annular, corrugated wall 69 of the port 23 lying between them forms a corrugated annular spring 70. The second filter fixing face 68 can also act as a second filter sealing face.

Figure 13:
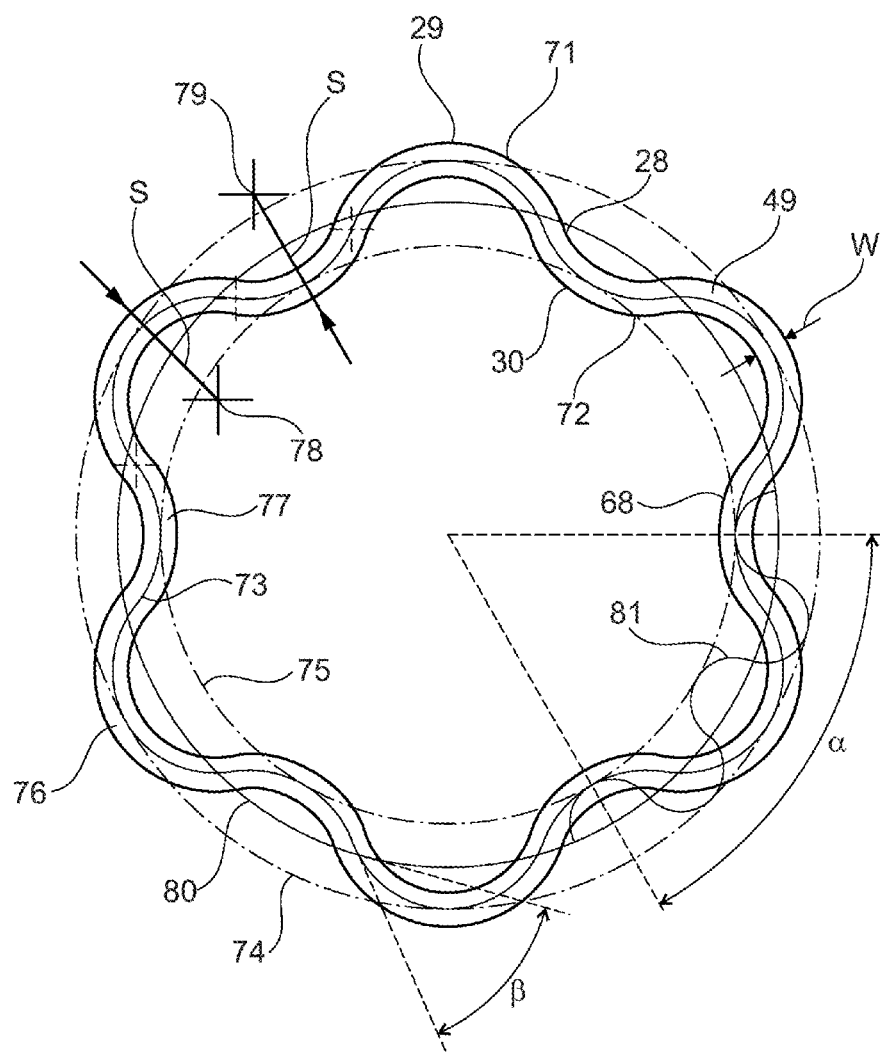
FIG. 13 shows a schematic end view of a filter port, in one example.
Figure 13A:
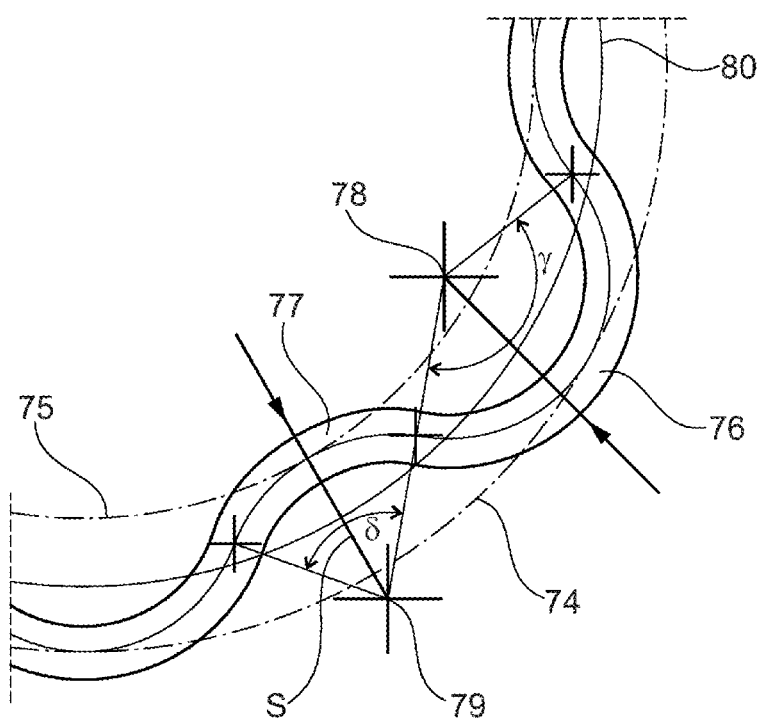
FIG. 13a shows an enlargement of a fragment from FIG. 13.

The filter port according to the end view in FIG. 13 and the enlarged detail according to FIG. 13a shows the corrugated form described, with convexities 29 and concavities 30. The annular wall 69 of the filter port 23 with a wall thickness W has the first filter fixing face 28 on the wall external side 71 and the second filter fixing face 68 on the wall internal side 72. The wall external side 71 and the wall internal side 72 run parallel in the view shown, but are beveled toward one another in the axial direction, which will be explained further below. The corrugated form is therefore further visualized by means of a center line 73 shown in dashed lines.

The center line 73 undulates between an outer envelope circle 74, whose radius has the largest value of the varying radius, and an inner envelope circle 75, whose radius has the smallest radius of the variable radius of the corrugated form. The convexities 29 and concavities 30 of the center line 73 form wave crests in the form of convex circle segments 76 and wave troughs in the form of concave circle segments 77. In the illustrated embodiment, all circle segments 76, 77 have the same segment radius S. The centers 78, 79 of the circle segments 76, 77 lie within the inner envelope circle 75 for the convex circle segments 76 and outside the outer envelope circle 74 for the concave circle segments 77. The convex circle segments 76 and the concave circle segments 77 merge tangentially and are evenly distributed over the circumference, resulting in a rotationally symmetrical shape. In the exemplary embodiment shown, six convex circle segments 76 and six concave circle segments 77 are provided, which alternate at an angular spacing of 30°, i.e. the convex circle segments 76 are apart at an angle α of 60°, as are the concave circle segments 77.

Due to the selection of the segment radius and the associated position of the associated center points 78, 79, the center line runs in a comparatively flat, curved, wavy manner around the center circle line 80. The center line 73 intersects the center circle line 80 at an obtuse angle β. As a result, the arc length of the convexities 29 is significantly longer than the arc length of the concavities 30, as a result of which the angle γ swept by the segment arc of the convexities 29 is significantly larger than the angle δ swept by the concavities 30. This shape improves the spring effect of the filter port 23.

For comparison, the drawing also shows circle segments 81 whose segment centers 82 lie directly on the center line 73. This profile, which is not realized in this embodiment, has significantly smaller segment radii and a course that is essentially perpendicular to the center line 73.

A good spring effect has been shown with radii and wall thicknesses in which the radius of the inner envelope circle 75 is between 5% and 15% of the radius of the outer envelope circle 74 and the radius of the convex and/or concave circle segments is between 20% and 35% of the radius of the outer envelope circle 74.

The wall thickness W between the wall external side 71 and the wall internal side 72 running parallel or inclined thereto (relative to the operating position) is preferably between 5% and 15% of the radius of the outer envelope circle 74.

In the example shown, the outer envelope circle 74 has a radius of approximately 11 mm and the inner envelope circle 75 has a radius of approximately 9.75 mm. The segment radius of the convex and concave circle segments is about 3.08 mm and the wall thickness between the outside of the wall 71 and the inside of the wall 72 running parallel or inclined thereto is about 0.9 mm.

Figure 14:
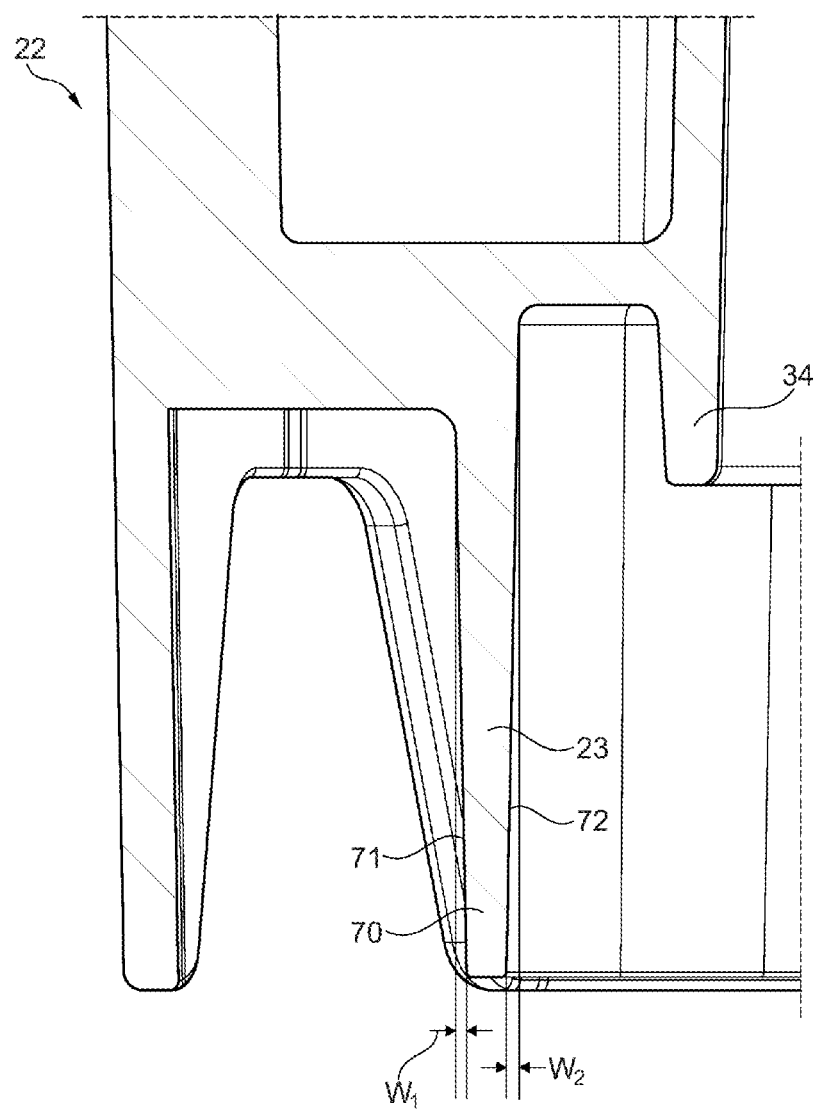
FIG. 14 shows a fragment of the filter cartridge showing the connection region to visualize a guiding aid by bevels of the port, in one example.

In FIG. 14 it can be seen that the external wall 71 and/or the internal wall 72 of the filter port 23, which depending on the embodiment also form(s) one or two filter sealing faces 28, is/are beveled by the angle ω1 or ω2 in relation to the vertical, so that they converge from top to bottom relative to the operating position of the filter cartridge 4, 22. This bevel or bevels by the angle or angles ω1 and/or ω2 form(s) an insertion aid when inserting the port 23 into the annular gap between the elastomer seal 16 and the external face 41 of the water tank 1.

Although the present invention has been described with reference to preferred embodiments, workers skilled in the art will recognize that changes may be made in form and detail without departing from the spirit and scope of the invention.

LIST OF REFERENCE SIGNS

1 Water tank
2 Tank bottom
3 Water tank side wall
4 Filter cartridge
5 Filter housing
6 Tank connection element
7 Filter connector
8 Interior
9 Tank port
10 Fastening ring
11 Centering element
12 Depression
13 Tank valve body
14 Seal
15 Pin
16 Elastomer seal
17 Water tank seal/annular seal
18 Tank sealing face
19 Concavity
20 Convexity
21 Connection region
22 Filter cartridge
23 Filter port/inner ring
24 Outer ring
25 Protrusion
26 Recess
27 Inlet screen
28 Filter sealing face/external face
29 Convexity
30 Concavity
31 Guide structure
32 Guide groove
33 Edge
34 Polygonal ring
35 Inner curvature
36 Wall
37 Filter housing
38 Metering opening
39 Bottom plate
40 Centering mandrel
41 External face
42 Concavity
43 Convexity
44 Tooth
45 Gradation
46 Elevation
47 Gap
48 Passage opening
49 Bottom passage opening
50 Cavity
51 Guide rib
52 Guide ramp
53 Latching protrusion
54 Bottom rib
55 Bottom portion
56 Sealing bead
57 Annular seal
58 Sealing groove
59 Inner ring
60 Outer ring
61 Bypass opening
62 Annular gap
63 Bypass opening
64 Sealing lip
65 Sealing face
66 Internal side
67 Restoring spring
68 Second filter fixing face/internal face
69 Wall
70 Annular spring
71 Wall external side
72 Wall internal side
73 Center line
74 Outer envelope circle
75 Inner envelope circle
76 Convex circle segment
77 Concave circle segment
78 Center
79 Center
80 Center circle line
81 Circle segment
82 Segment center
83 Turning point
84 Tank passage opening A Axis
W Wall thickness
S Segment radius
P1 Flow direction
P2 Flow direction

The invention claimed is:

1. A water tank for a household appliance having a filter cartridge, the filter cartridge including a filter housing, a filter inlet opening, a device for water conduction including at least one filter chamber having at least one filter medium, and a filter port having an annular filter sealing face, the annular filter sealing face having a separately disposed filter-proximal guide structure that forms an outlet line of the filter cartridge, which is disposed downstream of the filter housing, wherein the water tank comprises:
a tank bottom, wherein an annular tank sealing face is provided on the tank bottom for connection of the filter cartridge, and encloses a tank passage opening for water to flow from the filter cartridge through a wall of the tank bottom to the household appliance, wherein a centering element protruding from the tank bottom inside the annular tank sealing face in a direction of an assembly position of the filter cartridge is provided for insertion into the filter-proximal guide structure of the filter cartridge, and the centering element is provided with at least one water passage for water from the filter cartridge through the filter-proximal guide structure of an attached filter cartridge to the tank passage opening, and wherein the annular tank sealing face is configured and disposed separately from the centering element, and wherein a tank valve is provided which has a plug-in element which can be inserted through a passage in the centering element and is movable with a tank valve body.

2. The water tank of claim 1, wherein
the filter housing comprising a filter housing wall that separates a housing internal side from a housing external side,
the filter cartridge is open in relation to an external environment of the filter housing,
wherein the device for water conduction terminates in a filter outlet opening for suctioning water from the filter cartridge, and
wherein the device for water conduction is located downstream of the filter inlet opening relative to a flow direction of the water during operation.

3. The water tank of claim 2, wherein
the filter-proximal guide structure is provided within the annular filter sealing face and is separately disposed from the filter outlet opening and configured to receive the centering element for centering the filter cartridge.

4. The water tank of claim 2, wherein the filter-proximal guide structure has at least one guide ramp aligned obliquely in relation to an assembly direction of the filter cartridge.

5. The water tank of claim 1, wherein the filter-proximal guide structure comprises a plurality of guide ramps forming a centering aid and are directed toward a central axis of the filter-proximal guide structure.

6. The water tank of claim 1, wherein the filter-proximal guide structure includes a central axis and comprises at least one of:
one or more guide faces running parallel to the central axis; or
one or more guide faces disposed at an oblique angle to the central axis.

7. The water tank of claim 1, wherein the filter-proximal guide structure is configured and disposed coaxially with the annular filter sealing face.

8. The water tank of claim 2, wherein holding or latching elements are fitted in the filter-proximal guide structure.

9. The water tank of claim 1, wherein the filter-proximal guide structure has one or more guide grooves configured to receive tank-proximal structures.

10. The water tank of claim 1, wherein one or more guide ramps of the filter-proximal guide structure are fitted in one or more guide grooves for receiving tank-proximal structures.

11. The water tank of claim 1, wherein the centering element comprises a plurality of ribs which extend in a flow direction of the water during operation, an intermediate space of the plurality of ribs forming a water passage.

12. The water tank of claim 1, wherein the centering element consists of ribs disposed in a star shape.

13. The water tank of claim 1, wherein the centering element comprises at least one rib having an upper guide ramp and/or at least one guide face running parallel to a central axis for guiding the filter-proximal guide structure during assembly of the filter cartridge.

14. The water tank of claim 1, wherein the centering element comprises at least one rib having an upper guide ramp for a guiding interaction with at least one guide ramp of at least one guide groove of the filter-proximal guide structure during assembly of the filter cartridge.

15. The water tank of claim 1, wherein holding or latching elements are attached to the centering element.

16. The water tank of claim 1, wherein the centering element is attached to a fastening ring for the tank bottom.

* * * * *